April 12, 1955 W. C. TRAUTMAN ET AL 2,706,052
TRANSMISSION JACK
Filed May 3, 1951 4 Sheets-Sheet 4
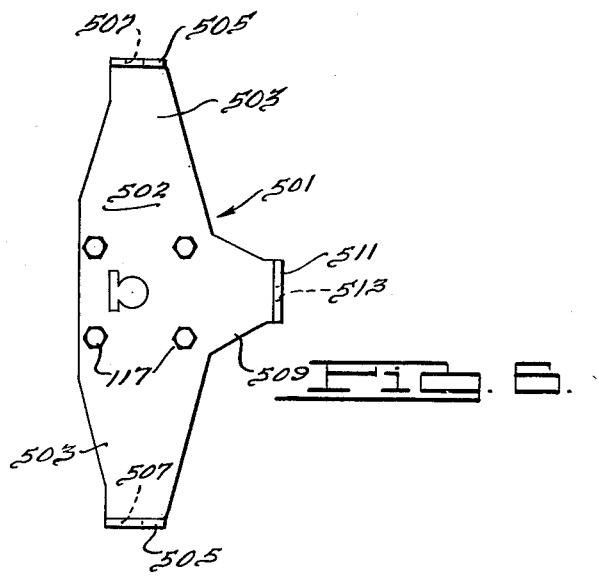
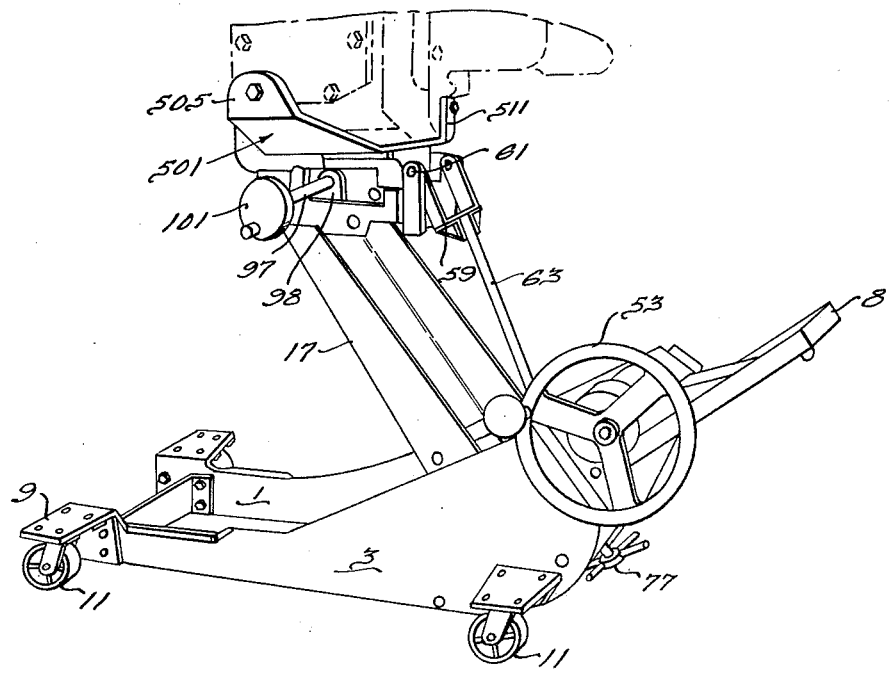
INVENTORS.
Walter C. Trautman,
Lyle L. Arnes.
BY
Harness, Dickey & Pierce
ATTORNEYS.

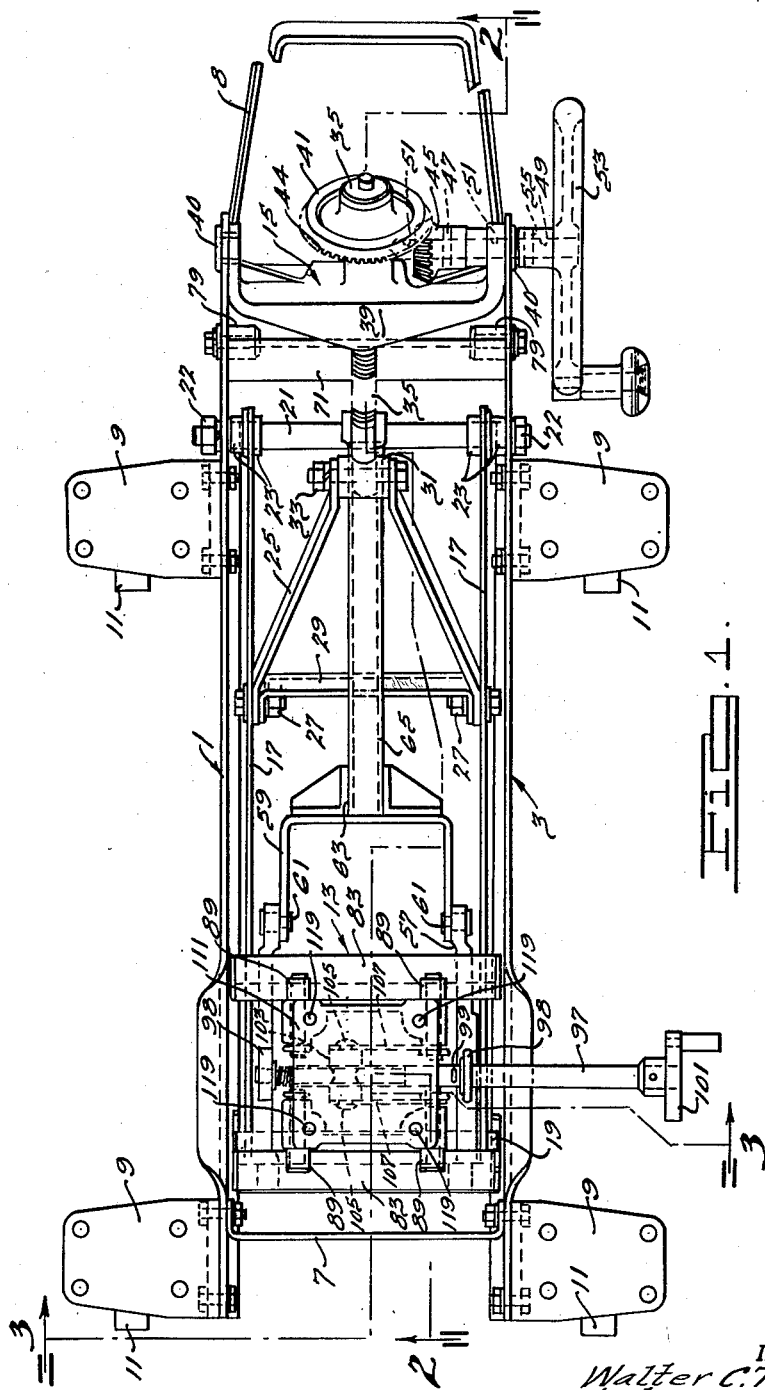

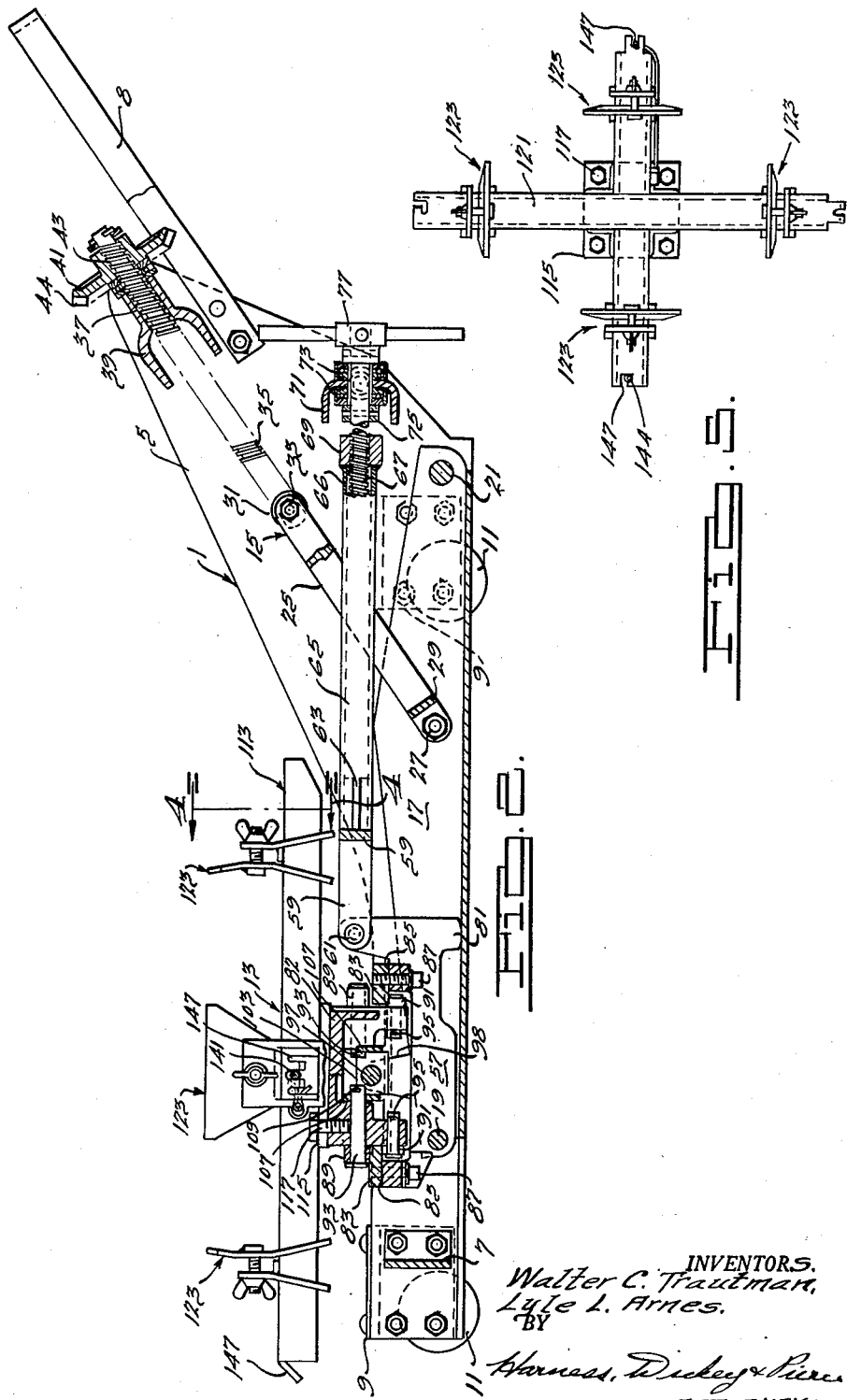

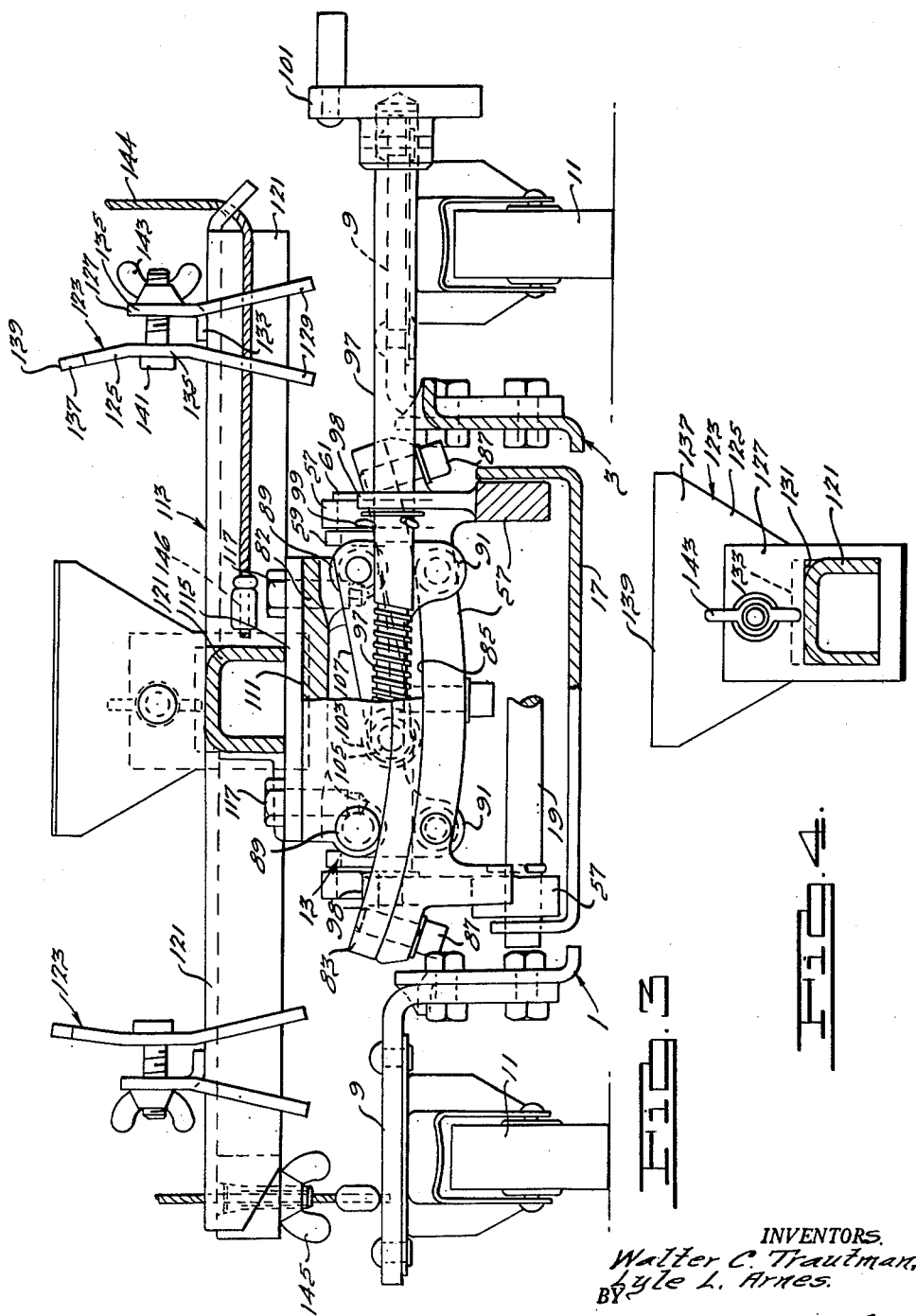

United States Patent Office 2,706,052
Patented Apr. 12, 1955

2,706,052

TRANSMISSION JACK

Walter C. Trautman and Lyle L. Arnes, Racine, Wis., assignors to Walker Manufacturing Company of Wisconsin, Racine, Wis., a corporation of Wisconsin Application May 3, 1951, Serial No. 224,311

5 Claims. (Cl. 214—1)

This invention relates to lifting devices and, in particular, to jacks for removing transmissions and lifting objects of various shapes.

Because of its bulk and shape, the automatic transmission has been difficult for repairmen to handle with the equipment heretofore available. Particular difficulty has been encountered in attempting to bolt the transmission back in place after the repair work has been completed. This requires accurate alignment of bolt holes on the transmission and automobile frame but the size and weight of the transmission is such that extreme patience and effort have been necessary to properly position the transmission for reconnection to the flywheel housing of the engine.

The present invention provides a jack which makes it a simple operation to remove or install an automatic transmission. It has a saddle for holding the transmission (or other object) which is elevated and lowered on a carriage that can be easily moved about on the ground. The saddle can be angularly adjusted about an axis that substantially coincides with the axis of the transmission thus greatly facilitating alignment of the mounting holes on the transmission and frame. Inasmuch as the axis with which the transmission axis is to coincide in installation may vary widely and is rarely parallel to the ground, the saddle is arranged so that it can be tilted at an angle to the horizontal thus tilting the axis of the transmission and the axis about which angular adjustment takes place. The saddle also may include individually adjustable rests for engaging the transmission casing thus insuring firm support of the transmission on the saddle.

Other features of the invention will appear upon consideration of the accompanying drawings which illustrate the principles of the invention and wherein:

Figure 1 is a plan view of one form of the invention with the saddle fixture removed;

Fig. 2 is a longitudinal section taken along the line 2—2 of Fig. 1;

Fig. 3 is a cross section taken on the line 3—3 of Fig. 1;

Fig. 4 is a cross section taken on line 4—4 of Fig. 2;

Fig. 5 is a plan view of the preferred form of saddle fixture;

Fig. 6 is a plan view of another form of saddle fixture; and

Fig. 7 is a perspective view of the jack in elevated position.

The mechanism of the drawings embodying an illustrative form of the invention includes a mobile carriage or frame structure that has left- and right-hand side plates 1 and 3 which extend upwardly in sections 5 at the rear of the unit. A cross brace 7 at the front of the unit is bolted at opposite ends to the opposite side plates and a combination cross brace and handle for pulling the carriage is bolted to the rear sections 5 of the side plates as shown at 8. Additional cross bracing is provided by other structure as will become apparent hereinafter. The side plates have rigidly secured thereto, adjacent the front and rear ends, four angle plates 9. Caster wheel units 11 are located beneath the horizontal flanges of the angle plates and are rigidly secured thereto and thus receive the load on the unit and enable it to be freely rolled about. Swivelling of the caster wheels permits the jack to be moved sideways into proper alignment with a transmission and, of course, rotation of the caster wheels permit this motion as well as fore and aft movement.

The operating structure of the jack is mounted on the side plates 1 and 3. This structure includes a head unit 13 upon which the transmission or other item to be lifted is mounted and also an elevating unit 15 for raising and lowering the head. In the present embodiment, the head unit includes means whereby the transmission engaging portion or saddle may be moved in an arcuate path having an axis which substantially coincides with the axis of the transmission and the elevating unit includes means whereby the head may be tilted on an angle to tilt the axis of the transmission.

The head unit 13 is mounted on and carried by a U-shaped bellcrank or lifting boom 17 of the elevating unit 15. The connection between the head 13 and bellcrank 17 is pivotal and provided by the transverse shaft 19 which is supported at opposite ends in the upright side edges at the forward end of the bellcrank 17. The bellcrank 17 is pivoted on a fixed axis at its rear end on the side plates 1 and 3 by means of the cross shaft 21 which is clamped against the outside faces of the side plates by nuts 22 threaded on its ends. Load from the head is transferred to the side plates through the shaft 21, hence the bearing connections between the bellcrank and shaft may be built up in a suitable manner as indicated at 23 and these may serve additionally as spacers to properly center the bellcrank 17 between the side plates 1 and 3.

The bellcrank 17 is moved about its pivot axis 21 by means of force applied through the fork 25, the legs of which are pivoted to an intermediate portion of the bellcrank 17 by bolts 27. A cross brace 29 for the legs of the fork 25 may also be secured by the bolts 27 to the fork and bellcrank. The fork 25 terminates at its rear end in a block 31 to which the legs of the fork are connected by bolt 33. The forward and lower end of a screw 35 is securely attached to the block 31, as by the bolt 33 passing through the end thereof, and serves as a means for applying lifting force to the fork 25 and thus to the bellcrank 17.

The screw 35 is freely received in a bore 37 of a yoke 39 that is pivoted on trunnions 40 to the side plates 1 and 3. The bore 37 extends longitudinally through the yoke 39 and the wall thereof serves as a support for the screw 35. Rotatably mounted on but contiguous to the yoke 39 is a gear 41 having a threaded bore 43 with which the screw 35 is drivably engaged so that rotation of the gear 41 results in axial movement of the screw in bores 37 and 43, this, of course, causing movement of the bellcrank 17. The gear 41 has external bevel teeth 44 which are engaged by the bevel drive gear 45. The drive gear 45 is connected by cross pin 47 to a shaft 49 which is journaled in suitable bearing bores 51 in the yoke, on the axis of the trunnions 40. The shaft 49 extends through the right-hand trunnion to the outside of the side plate 3 and there carries a hand wheel 53 that is connected to it by cross pin 55 so that manual rotation of the hand wheel 53 rotates the shaft 49 and thus the gears and therefore moves the bellcrank 17. For obvious reasons, the threads on screw 35 are designed in conventional manner so that the gears can be rotated only by the hand wheels, the load on bellcrank 17 therefore being unable to move it.

The head 13 includes a base casting 57 that receives the shaft 19 and which is thus directly mounted on the front end of bellcrank 17. The shaft 19 extends through the forward end of the casting 19 so that loads on the head tend to tip it in a clockwise direction on shaft 19 as viewed in Fig. 2. To combat this tendency and also to provide a means for permitting and regulating tipping about the axis of shaft 19, a yoke 59 has its legs connected by pivot pins 61 to the casting 57 on an axis located at the rear of the head 13 and above the axis of shaft 19 when the unit is in fully lowered condition. The yoke 59 is rigidly attached at 63 to the forward end of a variable length link 65 which forms a part of the elevating unit 15, it being observed that link 65 and bellcrank 17 form a parallelogram type linkage. The link 65 includes a tubular casing 66 which is welded or otherwise rigidly secured to the yoke 59 at connection 63 and which houses a screw shaft 67 that threads through a block 69 welded to the rear end of the casing 66. The screw shaft 67 rotatably extends through and is clamped to a rocker plate 71 via ball bearing assemblies 73 and lock ring 75 and mounts a hand drive wheel 77 at its free end. The rock plate 71 is pivotally carried by pins 79 that are mounted on the sides plates 1 and 3 on an axis above and to the rear of bellcrank axis 21. It is evident that rotation of hand wheel 77 will result in a change in length of link 65 and that this will be accommodated by rotation of the casting 57, and thus the entire head 13, about the axis of shaft 19.

The head casting 57 has feet 81 on its projections receiving pins 61 and these are arranged to rest on the web of the bellcrank 17 so as to support the head thereon in a horizontal position when the elevating unit 15 is fully lowered.

The head 13 includes a saddle support member 82 that is mounted on casting 57 so that it can move transversely and most desirably about an axis spaced above it, such axis preferably being longitudinal of the carriage or parallel to sides plates 1 and 3 and located substantially coaxially with the axes of transmissions ordinarily carried by the jack. For the purpose of this adjustment, the casting 57 is provided with longitudinally spaced tracks 83 that extend parallel to the pivot shaft 19. The tracks 83 are preferably formed by arcuate bars that inwardly overhang arcuate surfaces 85 formed on opposite sides of the casting 57 and which are rigidly connected thereto as by bolts 87. The support member 82 fits between the inside vertical faces of tracks 83 and on its front and rear sides carries left-hand and right-hand sets of rollers, all sets being similar in construction and function. Each set of rollers includes an upper roller 89 that rides on the top surface of a track 83 and a lower roller 91 which is engageable with the underside of the overhanging portion of a track 83. The upper roller 89 is carried by a shaft 93 journaled in the member 82 and the lower roller 91 is carried by a shaft 95 also journaled in member 82. The upper rollers 89 transfer the weight of the transmission or other object being carried to the tracks 83 while the lower rollers 91 prevent separation of the member 82 from the casting 57. As indicated best in Fig. 3, the surfaces 85 and tracks 83 are arcuate about an axis which is located above them and preferably substantially coaxial with transmissions carried by the jack.

The member 82 is moved on tracks 83 by rotation of screw shaft 97 that is journaled in uprights 98 formed integrally on longitudinal left and right sections of the casting 57 and which is held in place by cotter pins 99. The screw shaft is turned by a hand wheel 101 which is mounted thereon and which is located beyond the right-hand side plate 3 and thus is accessible from the same side of the unit as hand wheels 53 and 77. The screw shaft 97 threads into a block 103 that is pivoted by pins 105 on side links 107 which may be conveniently connected to the member 82 by way of roller shafts 93, cotter pins 109 extending through the shafts 93 holding the links 107 and shafts in place.

The top of the saddle support member 82 is shown as a flat surface 111 which will readily receive and support a wide variety of saddle fixtures which, in turn, directly receive and engage the object to be lifted. Figs. 2–5 show one type of saddle fixture 113 that can be adapted to receive objects of various shapes and contours. The fixture 113 has a base plate 115 that rests on surface 111 and which is rigidly secured to the member 82 by bolts 117 that extend therethrough into tapped holes 119 opening out of the surface 111. The fixture or adapter saddle 113 is in the shape of a cross and therefore has four arms 121 radiating from the base plate 115 and making right angles with each other. The arms 121 are preferably made of downwardly opening channel sections as best shown in Figs. 3 and 4. The saddle 113 includes work rests 123 mounted on the arms, and slidable lengthwise thereof, and which are capable of being locked in any desired radial position. The work rests 123 that are shown are identical in construction and each includes a pair of spaced upright plates 125 and 127. Each plate has a bottom section 129 that is provided with an aperture 131 to receive an arm 121, the plate 127, however, having a spacer section 133 bent at an angle toward the plate 125 and resting on the top surface of the arm 121 to define the top edge of its aperture 131. Each plate has sections 135 that are directly above the arms 121 and substantially perpendicular to them but make slight angles with the bottom sections 129, the latter diverging from each other on the plates of a single rest as shown in Figs. 2 and 3. The inner plates 125 directly engage the work and for this purpose have top sections 137 that extend upwardly from the sections 135 and are bent inwardly at angles thereto which may be the same as the angles on which the bottom sections 129 are bent with respect to sections 135. The sections 137 preferably are flared outwardly as shown to provide a work contacting edge 139 of substantial length. In order to lock the plates 125 and 127 of each work rest 123 to its arm 121, a stud 141 is welded to the sections 135 of plate 125 and extends through a suitable aperture in the section 135 of the outer plate 127. A wing nut 143 threads on the end of the stud and shoulders on the outer face of plate 127. When the nut is turned in one direction, the plates 125 and 127 are moved toward each other. This occurs freely until the spacer 133 on plate 127 abuts the section 135 of plate 125. Further tightening of the nut continues to draw the plates together but to accommodate this the plates must rock on the arm 121. This causes the arm to bind on the walls of apertures 131 so that the work rest is locked tightly in fixed position on the arm.

The operation of the jack has already been fully indicated. The various adjustments enable the head 13 to be placed in precisely the most desirable position to contact the transmission in lowering it and to align it with the bolt holes in the automobile when elevating it. Thus, fore and aft adjustment of the entire unit is made on wheels 11 and swivelling of the wheels enables sidewise adjustment. The head 13 is raised and lowered by turning the hand wheel 53 and it can be tilted at an angle to the vertical by means of hand wheel 77. Further adjustment transverse of the side plates 1 and 3 is obtained by means of hand wheel 101 which moves the saddle on the tracks 83, this motion taking place about an axis substantially midway between the side plates 1 and 3 and parallel thereto and spaced above the saddle so that it may coincide approximately with the axes of transmissions to be handled by the jack. Additional adjustment to conform to the individual surface characteristics of the object being carried is permitted by the radial adjustment of the work rests 123. A cable 144 may be used to lash the transmission in place on the work rests 123, it being anchored by fitting 146 to the inside of one arm 121 and adjustably locked to the opposite arm 121 by means of a suitable wedge lock 145. The cable passes through slots 147 in the ends of the arms which prevent its transverse slipping.

Figs. 6 and 7 show a different form of saddle fixture 501 that is adapted for use with the Chevrolet Power-Glide transmission and which illustrates that various types of fixtures may be used, if desired, with the jack of this invention. The fixture 501 is used in place of saddle 113 which is removed so that plate 502 may be secured on member 82 by bolts 117. Plate 502 has two opposite arms 503 which have upright flanges 505 at their ends with holes 507 therein. A third and shorter arm 509 lies intermediate the other two and at right angles to them and is also provided at its end with an upright flange 511 with an aperture 513 therein. As shown in Fig. 7, the arms of fixture 501 embrace the bottom sides of the Power-Glide transmission so that bolts may be passed through openings 507 and 513 to thread into the transmission and secure it in place.

The invention may be embodied in constructions other than illustrated herein, another form being described and claimed in a copending application of Walter C. Trautman and Robert W. McNabb, entitled "Transmission Jack," and filed September 15, 1951, Serial No. 246,762 hence it is not intended to limit the invention to the specific structure disclosed above.

What is claimed is:

1. In a saddle having an arm, a work rest slidable on said arm, said rest including spaced upright members having apertures therein through which said arm extends, a spacer between said members, and means for drawing said members toward each other, said spacer being located between said arm and means whereby a member may be canted upon said drawing together to wedge the wall of its aperture against said arm and lock the rest in place on the arm.

2. In a portable jack, the combination of a pair of parallel vertical side plates extending longitudinally of the jack, wheels movably supporting the side plates, a longitudinally extending lifting boom pivoted at one end on a cross shaft between the side plates at the rear ends of the side plates, a load engaging head adapted to support automotive transmissions carried by the other end of the boom, said boom being substantially horizontal when the head is in lowermost position, link means pivoted at one end to the boom on an axis located forwardly of the cross shaft and connected at the other end to a cross bar that is pivoted to the side plates on an axis located above and rearwardly of said cross shaft, said link means including a screw shaft means, screw shaft operating means carried by the cross bar, cross bracing between the side plates including a handle at the rear ends of the side plates, said head including a base pivoted on the front end of the boom, a longitudinally extending link pivoted at its front end to said base, a cross member pivoted to the side plates on an axis above the cross shaft, said link being connected to the cross member, said link including screw shaft means for varying its length, said link being substantially horizontal when the head is in lowermost position.

3. In a portable jack for handling transmissions, the combination of a frame having wheels, a lifting boom extending longitudinally of the frame and pivotally mounted thereon, said wheels permitting longitudinal movement of the frame and boom, a rigid handle on the frame located rearwardly of said wheels and substantially above them, longitudinal screw means connected to the boom and to the frame for elevating the boom, said screw means being pivoted on the handle end of the frame on a transverse rocker bar adjacent the handle, a transverse operating shaft for said screw means extending through said rocker bar and carrying an operating handle on the side of the frame and adjacent said rigid handle, a load engaging head having a base pivoted on one side to the free end of the boom, a longitudinal link pivoted to the other side of the base and above its pivot to the boom, the other end of said link being pivoted to the frame, said link including a screw shaft for varying the length thereof and having an operating handle located beneath the rigid handle, said head including a pair of parallel transverse tracks on the base projecting inwardly toward each other from the front and rear of the base, a saddle having four pairs of wheels engaging said tracks, each pair including a wheel engaging the top and a wheel engaging the bottom of the track, there being two pairs of wheels on each track one of which is located on each transverse side of the saddle, and a screw shaft journaled in the base and threaded into a means carried by the saddle and having an operating handle located on the same side of the frame as said operating handle.

4. The invention set forth in claim 3 wherein said tracks are arcuate about a longitudinal axis spaced above the saddle.

5. In a jack for transmissions or the like, the combination of a carriage movable across a floor, a support member secured at one end to said carriage and having a vertically movable free end extending upwardly from the carriage, means for moving said free end vertically, a load engaging head having a base movably mounted on said free end, said head including a pair of parallel transverse tracks on the base with overhanging projecting portions extending along the entire lengths thereof to provide top and bottom wheel runways on each track, a saddle having four pairs of wheels engaging said projecting portions, each pair of wheels including a wheel engaging the top runway and a wheel engaging the bottom runway of the track, there being two pairs of wheels on each track one of which is located on each transverse side of the saddle, and a screw shaft journaled in the base and threaded into means carried by the saddle and having an operating handle whereby rotation thereof moves said saddle on the tracks.

References Cited in the file of this patent

UNITED STATES PATENTS

| | | |
|---|---|---|
| 1,751,480 | Howell | Mar. 25, 1930 |
| 2,039,896 | Green | May 5, 1936 |
| 2,377,477 | Bloch | June 5, 1945 |
| 2,391,813 | Wood | Dec. 25, 1945 |
| 2,418,443 | Wiesner | Apr. 1, 1947 |
| 2,454,840 | Ryan | Nov. 30, 1948 |
| 2,479,623 | Johnson | Aug. 23, 1949 |
| 2,523,734 | Stephenson et al. | Sept. 26, 1950 |
| 2,583,114 | Monteith | Jan. 22, 1952 |

FOREIGN PATENTS

| | | |
|---|---|---|
| 707,112 | Germany | June 13, 1941 |